United States Patent [19]

Kumai et al.

[11] Patent Number: 5,779,377
[45] Date of Patent: Jul. 14, 1998

[54] PRINTING APPARATUS

[75] Inventors: Eiji Kumai; Akira Takagi; Satoshi Fujioka. all of Nagano, Japan

[73] Assignee: Seiko Epson Corporation. Tokyo, Japan

[21] Appl. No.: 770,811

[22] Filed: Dec. 20, 1996

[30] Foreign Application Priority Data

Dec. 20, 1995 [JP] Japan ................................ 7-332212

[51] Int. Cl.$^6$ ................................................ B41J 19/96
[52] U.S. Cl. ................... 400/555; 400/124.04; 400/568; 347/41
[58] Field of Search .......................... 400/555, 568, 400/582, 124.04; 347/41

[56] References Cited

U.S. PATENT DOCUMENTS

| | | | |
|---|---|---|---|
| 4,198,642 | 4/1980 | Gamblin | 346/75 |
| 4,401,991 | 8/1983 | Martin | 346/75 |
| 4,737,041 | 4/1988 | Nakayama | 400/582 |
| 4,743,127 | 5/1988 | Uematsu | 400/54 |
| 4,887,094 | 12/1989 | Izumi et al. | 400/582 |
| 4,999,646 | 3/1991 | Trask | 347/41 |
| 5,297,871 | 3/1994 | Fujioka | 400/582 |
| 5,300,950 | 4/1994 | Lopez | 347/41 |
| 5,429,441 | 7/1995 | Schulz et al. | 400/124.04 |
| 5,625,389 | 4/1997 | Eriksen | 347/41 |
| 5,686,944 | 11/1997 | Takagi | 347/41 |
| 5,717,447 | 2/1998 | Fujimoto | 347/41 |

FOREIGN PATENT DOCUMENTS

| | | | |
|---|---|---|---|
| 0 679 518 A | 11/1995 | European Pat. Off. | 347/41 |
| 53-2040 | 1/1978 | Japan | 400/124.01 |
| 3-207665 | 9/1991 | Japan | 400/124.01 |
| 4-19030 | 1/1992 | Japan | 400/124.01 |

*Primary Examiner*—Edgar S. Burr
*Assistant Examiner*—Steven S. Kelley
*Attorney, Agent, or Firm*—Sughrue, Mion, Zinn, Macpeak and Seas, PLLC

[57] ABSTRACT

A printing apparatus comprises: a print head comprising an array having an N (N=positive integer) number of dot forming elements arrayed at fixed pitches having a lower end and an upper end; a horizontal scan driver for moving the print head above and along a print medium in a horizontal scan direction; a vertical scan driver for moving the print medium in a vertical scan direction perpendicular to the horizontal scan direction, wherein a vertical scan distance that the print medium is vertically moved when the vertical scan driver is driven one time is selected such that the position of at least one dot forming element, counted from the lower end of the array of the print head in the drive of a horizontal scan is coincident with the position at least one dot forming element, counted from the upper end of the array of the print head in the drive of the horizontal scan drive after a given number of horizontal scan drives; and a head driver for performing a printing operation by intermittently driving the dot forming element located at the coincident positions, counted from the upper or lower end of the array.

6 Claims, 11 Drawing Sheets

FIG. 6

6-LINE SINGLING

FIG. 7

FILLED WITH 5-PATH

FIG. 8

FULL SINGLING

FIG. 9

| PITCH VARIATION METHOD | -3 (-26) | -2 (-17) | -1 (-9) | 0 (0) | 1 (9) | 2 (17) | 3 (26) |
|---|---|---|---|---|---|---|---|
| CONVENTIONAL | × | × | × | ○ | ○ | × | × |
| 2-LINE SINGLING | × | ▲ | ○ | ◎ | ○ | ○ | × |
| 3-LINE SINGLING | × | ○ | ○ | ◎ | ○ | ○ | × |
| 6-LINE SINGLING | × | × | ▲ | ○ | ○ | × | × |
| FILLED WITH 5-PATH | × | × | ▲ | ○ | ○ | × | × |
| FULL SINGLING | × | × | ▲ | ◎ | ○ | × | × |

PITCH VARIATIONS SHOW NUMBER OF PULSE AT DRIVING FEEDING MOTOR (NO. OF PULSE)
NUMBERS INSIDE ( ) SHOW LENGTH THEREOF ($\mu$m)

EVALUATION: ◎ VERY GOOD QUALITY WITHOUT STRIPE
○: GOOD QUALITY WITHOUT STRIPE
× NG
▲ ALLOWABLE QUALITY WITH STRIPE

FIG. 10(a)

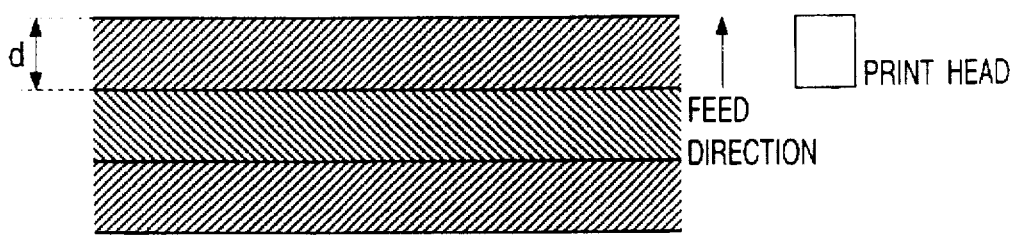

FIG. 10(b)

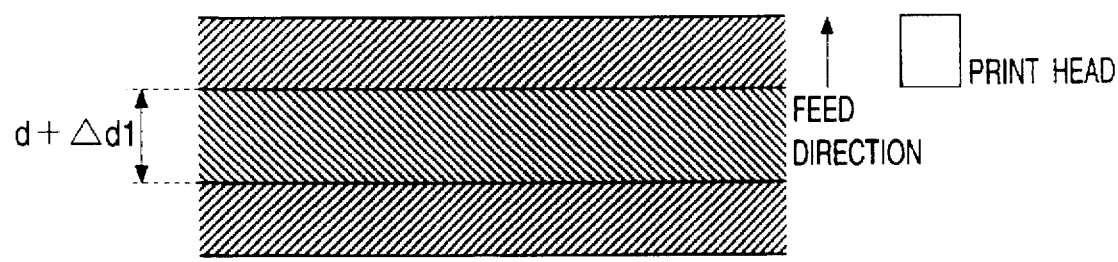

FIG. 10(c)

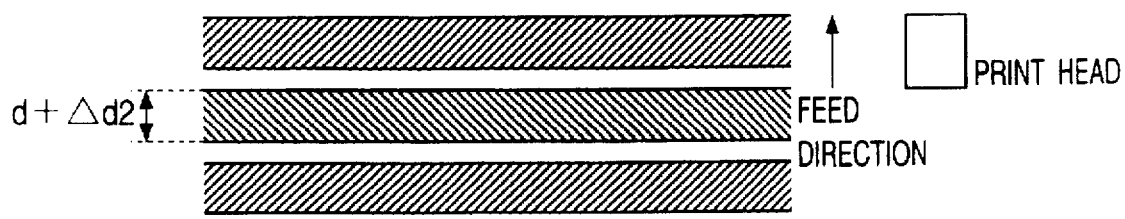

PRINTING APPARATUS

BACKGROUND OF THE INVENTION

The present invention relates to a printing apparatus which prints on a printing medium while scanning the printing medium with a print head, such as a printer of the serial scan (or line scan) type.

Originally, the printing apparatus is developed as a substitution of the typewriter for printing characters. The early printing apparatus, like the typewriter, is a serial printer for printing characters by the combination of a horizontal scan motion and a vertical scan motion. For the horizontal scan motion, the print head is moved in the horizontal direction (or horizontal scan direction) with respect to a print medium (for instance, print paper). For the vertical scan motion, the print paper is moved or fed in the vertical direction (or vertical scan direction).

The serial printer prints while the print head scans as a raster on the print paper. The serial printer involves various types of printers such as a dot impact printer, a thermal transfer printer, an ink jet printer, and the like. The print head includes an array comprising a number of dot-forming elements (e.g., multi-pin needle head, thermal heads and ink jet nozzles) that are linearly arrayed in the vertical scan direction. The prints head having the thus arrayed dot-forming elements concurrently prints a plural number of lines by its motion of one horizontal scan path.

In such printing apparatuses, which have thus far been designed for the printing of only characters, a recent trend of its design is oriented to the printing of graphics having more intensive visual presentation. Various types of printing apparatuses capable of printing graphics have been marketed. Those printing apparatuses are designed on the basis of such a feature of the array of the print head that a plural number of dots are vertically and linearly arrayed within a pitch width that corresponds to the height of mainly used characters. In the apparatuses, a print paper is fed every pitch width of the print head in the vertical direction, as shown in FIG. 10(a).

In the serial printer using such a print head, variations are inevitably present in the characteristics of the individual dot forming elements, in the dot pitches, and in the accuracy of the paper feeding. Because of these variations, undesired phenomena take place. The first is the vertical overlapping in the printed image as shown in FIG. 10(b). The second is gaps formed between the adjacent prints when viewed in the vertical scan direction, as shown in FIG. 10(c). The gaps appear in the form of horizontally extending stripes on the printed image. Those phenomena greatly degrade the print quality of the printed image.

Solutions to those problems are proposed in U.S. Pat. No. 4,198,642 and Japanese Patent Application Laid-Open No. Sho. 53-2040. The serial printer, particularly the ink jet printer, is discussed in those publications. The printing technique broadly distributes the variations of the ejecting characteristics of the ink jet nozzles and the nozzle pitches over the printed image, to thereby make them indistinct. This print technique is called "interlace printing method (or microweave printing method)" (standardized as an interlace printing method in the specification).

The nozzle array, used in the interlace printing method, comprises an n number of ink jet nozzles, which are arrayed within a pitch corresponding to a k number of dot pitches, which define the print resolution in the vertical scan direction. The number "k", representative of the nozzle pitches of the print head, is an integer, which is smaller than the number "n" of the nozzles and the number "k" and the number "n" are mutually prime. The print paper is moved a distance corresponding to the n-dot pitches every time the nozzle array runs one horizontal scan path.

A specific example of the printing by the interlace printing method will be described with reference to FIG. 11. In the description to follow, it is assumed that for the print at 360 DPI (dot per inch), for example, the print head has a nozzle array consisting 20 number of nozzles (n=20), which are arrayed at pitches each equal to the pitch of three dots (3-dot pitch) (k=3).

When expressing distance in inch, one dot pitch is $\frac{1}{360}$ inch. k (nozzle pitch)=$\frac{1}{360}$ inch×3 =$\frac{3}{360}$ inch. The paper feed distance=$\frac{1}{360}$×20 (=n)=$\frac{20}{360}$ inch.

Now, if the paper is fed at one time, then each of the nozzles advances to the position one-dot pitch this side of the position of the 8th nozzle (#8) in the first horizontal scan (or the position advanced a distance of $\frac{21}{360}$ inch). If the paper is fed again, each of the nozzles advances to the position 2-dot pitch this side of the 15th nozzle (#15) in the first horizontal scan (or the position advanced $\frac{42}{360}$ inch).

In other words, if lines are printed with the nozzles in a horizontal scan path, then in a second horizontal scan path, the lines above the printed lines are printed with other nozzles, which are spaced a 7-nozzle distance from those used for the printing in the first horizontal scan path. In a third horizontal scan path, the lines above the lines printed in the second horizontal scan are printed with additional nozzles, which are spaced a 14-nozzle distance from the nozzles used for the printing in the second horizontal scan path.

Thus, in the printing by the interlace printing method, the adjacent lines are printed necessarily with different nozzles. Therefore, even if the ejecting characteristics of the individual lines and the nozzle pitches are slightly varied, the variations are indistinct on the printed image. Accordingly, the printed image is improved.

Another technique to improve the image quality in the color ink jet printer, which belong to the category of those ink jet printers, is disclosed in Japanese Patent Laid-Open Publication Nos. Hei. 3-207665 and 4-19030. This technique is called a "singling" (multi-scan) printing method (standardized as a "singling" method in the specification).

In the print by the "singling" printing method, a print head is used which contains nozzle arrays for ejecting ink of different colors, for example, cyan (C), magenta (M), yellow (M) and black (B), which are arranged in parallel in the horizontal scan direction. Those nozzle arrays are driven at intermittent timings through one scan. Dots are formed in the horizontal scan direction at intervals each consisting of a fixed number of dots, and the nozzle arrays form dots at different positions. The horizontal scan is repeated a plural number of times at different nozzle drive timings to form all the dots on the lines continuous in the horizontal scan direction.

In the "singling" basis printing, ink dots of different colors are by no means formed at the same positions in one horizontal scan. Accordingly, the phenomenon, called the ink breed, in which the dots of different colors overlap to degrade the printed image quality, never happens.

In the conventional interlace basis printing, a little variation of the ink ejecting characteristics of the individual nozzles and the nozzle pitches appears indistinctly on the printed image, resulting in the improvement of the print quality. In this respect, the interlace printing method is excellent in principle. However, it suffers from the following disadvantages.

Recent market trends require the printers to print quality images and to reduce the time for printing the quality images. One of the approaches to improve the image quality (considered to be most widely used) is to increase the resolution at the time of printing. However, the approach has a problem in that the amount of dot writing work is increased and hence the time taken for the dot writing is increased. A possible solution to the problem is to increase the number of head nozzles arrayed in the vertical scan direction and the vertical scan distance (i.e., the paper feed pitch). By doing so, the number of horizontal scans is reduced for the entire print.

Even in the interlace basis printing, if the vertical scan distance is increased, the stripe pattern appears on the printed image. This phenomenon is empirically confirmed by the inventors of the present patent application.

More specifically, in a printer of 720 DPI in resolution, the stripe pattern is indistinct when the vertical scan distance is 0.5 mm (=15/720 inch). However, when it is 1.09 mm (31/720 inch), the stripe pattern is distinct and clearly seen. This fact is also supported by the result of the analysis using the spatial frequency: The capability of the human eyes to perceive the stripe pattern is greatly changed before and after the stripe pitch of 0.5 mm.

Because of the consistent effort to satisfy the market need for the serial printer, the vertical scan distance tends to be long. This is the problem to urgently be solved in the serial printer. It is very important to clear up the cause of this and to take some measure for removing the cause.

The inventors investigated into the cause of such an unwanted phenomenon that in the interlace basis printing, the stripe patterns appear on the printed image depending on the vertical scan distance. The cause could not be clearly explained but it would be surmised as in the following.

FIG. 12 is a diagram for explaining an example of the print made by the interlace printing method. In FIG. 12, a print head 2 comprises 31 number of ink jet nozzles arrayed at intervals of 4/720 inch in the vertical scan direction. The vertical scan distance is set at 1/720 inch. A interlace basis printing is made at the resolution of 720 DPI.

Attention is invited to the 31st nozzle of the 31 ink jet nozzles of the print head 2 on the Nth path (in FIG. 12, the leftmost dot series or the second dot series counted from the left side).

In the printing by the interlace printing method, in the next (N+1)th path, the 23rd nozzle prints a dot at a location higher than the dot printed with the 31st nozzle in the Nth path but where it partially overlaps with the dot printed with the 31st nozzle. In the (N+2)th path, the 15th nozzle prints a dot at a location higher than the dot printed with the 23rd nozzle in the (N+1)th path but where it partially overlaps with the 23rd nozzle. Further, in the (N+3)th path, the 7th nozzle prints a dot at a higher than the dot printed with the 15th nozzle in the (N+2) path but where it partially overlaps with the dot printed with the 15th nozzle. At the same time, the 8th nozzle prints a dot at a location lower than the dot printed with the 31st nozzle in the Nth path but where it partially overlaps with the dot printed with the 31st nozzle.

At this time, the dot printed with the 31st nozzle in the Nth path is already present at the location higher than the area of the dot printed with the 8th nozzle. Accordingly, the dot to be printed with the 8th nozzle in the (N+3)th path partially overlaps with the dot printed with the 31st nozzle in the Nth path and the dot printed with the 16th nozzle in the (N+2)th path.

When the dots thus overlap, the color density of the overlapping dots is high. Accordingly, the dot overlapping the lower part of the dot printed with the 31st nozzle in the Nth path is denser in color than other dots not overlapping. In FIG. 12, the achromatic color densities of the dots are ordered in accordance with the color densities of the printed dots.

In FIG. 12, in a high density stripe area where the dots of high color density are formed, the pitch is equal to the length of 3 dots (3/720 inch), while in the remaining area, the pitch is equal to the length of 4 dots. Accordingly, the dots in the high density stripe area are denser than those in the remaining areas. It is considered that this forms the stripe pattern.

The high density stripe area appears every location of the upper or lower end of the nozzle linear array, viz., at the intervals of the vertical scan distance in the interlace basis printing.

The pitches at which the dots of high color density appear are not uniform, as described above. This arises from the fact that the vertical scan distance is set up under the condition that in the interlace basis printing the different nozzles are by no means positioned at the same places.

SUMMARY OF THE INVENTION

Accordingly, an object of the present invention is to provide a printing apparatus which can print a quality image even if the vertical scan distance is long.

To solve the problems, there is provided a printing apparatus comprising: a print head comprising an array having an N (N=positive integer) number of dot forming elements arrayed at fixed pitches having a lower end and an upper end; horizontal scan drive means for moving the print head above and along a print medium in a horizontal scan direction; vertical scan drive means for moving the print medium in a vertical scan direction perpendicular to the horizontal scan direction, wherein a vertical scan distance that the print medium is vertically moved when the vertical scan drive means is driven one time is selected such that the position of at least one dot forming element, counted from the lower end of the array of the print head in the drive of a horizontal scan is coincident with the position at least one dot forming element, counted from the upper end of the array of the print head in the drive of the horizontal scan drive after a given number of horizontal scan drives; and head drive means for performing a printing operation by intermittently driving the dot forming element located at the coincident positions, counted from the upper or lower end of the array.

In the printing apparatus, a microweave pitch M by the vertical scan drive means and an element-to-element interval K are mutually prime, and M+t=N holds, where M=(vertical scan drive pitch by the vertical scan drive means)/(print resolution), K=(print resolution)/(nozzle pitch), and t=number of lines intermittently printed by the head drive means.

Furthermore, in the printing apparatus, t, number of lines intermittently printed by the head drive means is 2 or 3.

Alternatively, in the printing apparatus, t=N/2.

BRIEF DESCRIPTION OF THE DRAWINGS

FIG. 6 is a diagram showing a print by the 6-line singling;

FIG. 7 is a diagram showing a print filled with five paths, not using the singling printing method;

FIG. 8 is a diagram showing a print by the full singling;

FIG. 9 is a table showing the relationships between the variations of the pitch of the vertical scan distance and the image quality in the prints;

FIGS. 10(a) to 10(c) are diagrams useful in explaining the print output from a conventional serial printer;

DETAILED DESCRIPTION OF THE PREFERRED EMBODIMENTS

The preferred embodiment of a printing apparatus according to the present invention will be described with reference to the accompanying drawings.

Figure 1:
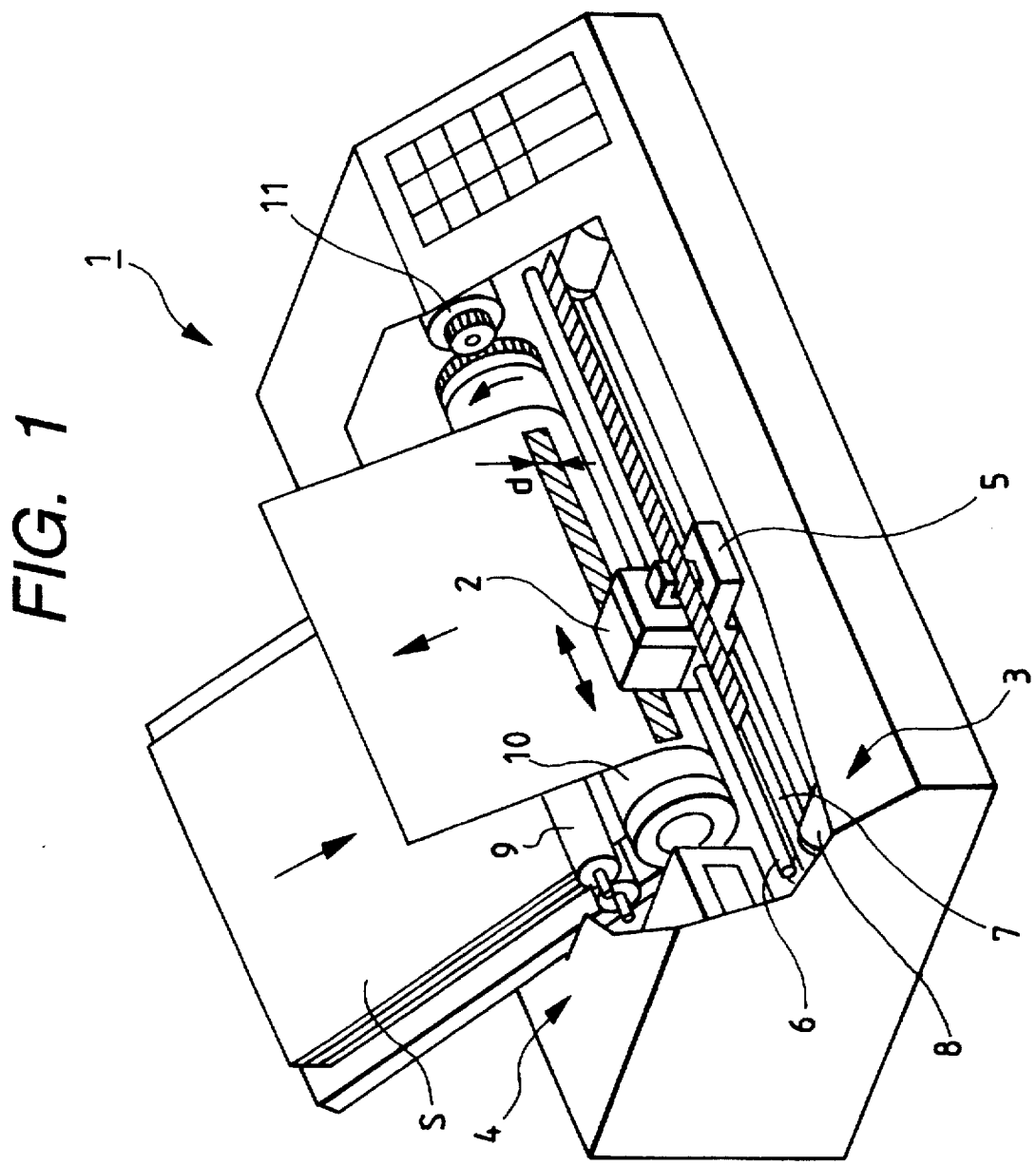
FIG. 1 is a perspective view showing an ink jet printer according to the present invention.

FIG. 1 is a perspective view showing an ink jet printer as an embodiment of a printing apparatus according to the present invention. The ink jet printer 1 generally comprising a print head 2 for printing on a print paper S as an example of a print medium, horizontal scan drive means 3, and vertical scan drive means 4.

The print head 2 is a nozzle head with 31 (N=31) ink jet nozzles (nozzle array) arrayed at $4/720$ inches in the vertical scan direction. The nozzles of the nozzle array are driven by head drive means (not shown) to eject ink droplets to the print paper S.

The horizontal scan drive means 3 includes a carriage 5 with the print head 2, a guide rail 6, an endless belt 7 and a pulse motor 8. The pulse motor 8 rotates the endless belt 7, and with the turn of the belt 7, the carriage 5 is moved along the guide rail 6. At this time, the print head 2 is moved in the horizontal scan direction by the carriage 5.

The vertical scan drive means 4 includes a roller pair 9, a roller 10, and a pulse motor 11. In operation, the pulse motor 11 is driven, the roller pair 9 pulls down a print paper S toward the roller 10, and the roller 10 feeds the print paper S.

In the printer, the vertical scan distance produced by the vertical scan drive means 4 is selected such that the position of at least one nozzle, counted from the lower end of the nozzle array in the drive of an n-th scan is coincident with the position at least one nozzle, counted from the upper end of the nozzle array in the drive of the path after a given number of drives of paths. The "singling" basis printing method is applied to the printing of the coincident dot positions, so that the printing at those positions are intermittently carried out and hence the defect by the coincidence of the printed dot positions is solved.

The printer will be described by using specific embodiments.

Figure 2:
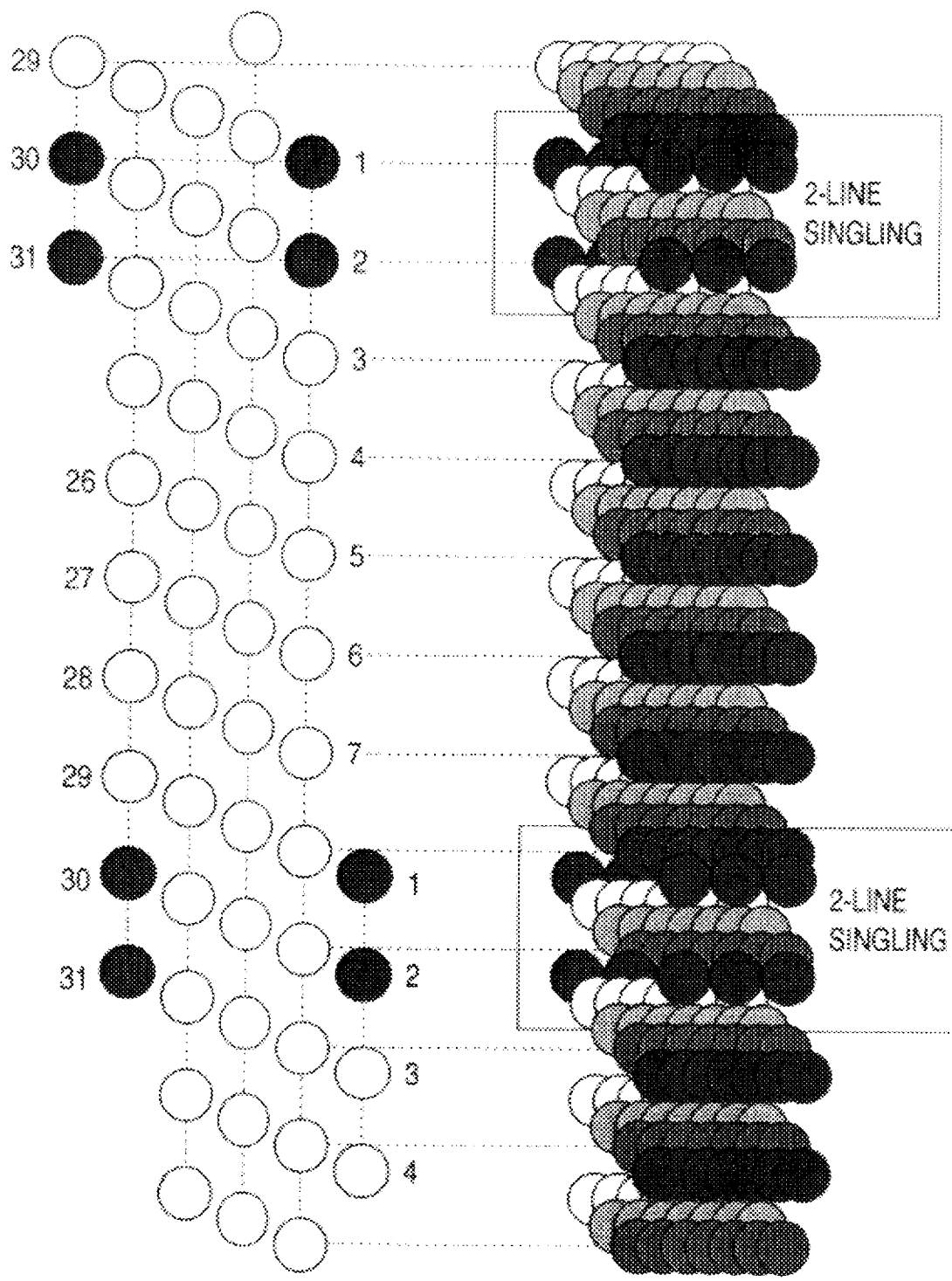
FIG. 2 is a diagram for explaining a print output from the printer of the present invention.
Figure 12:
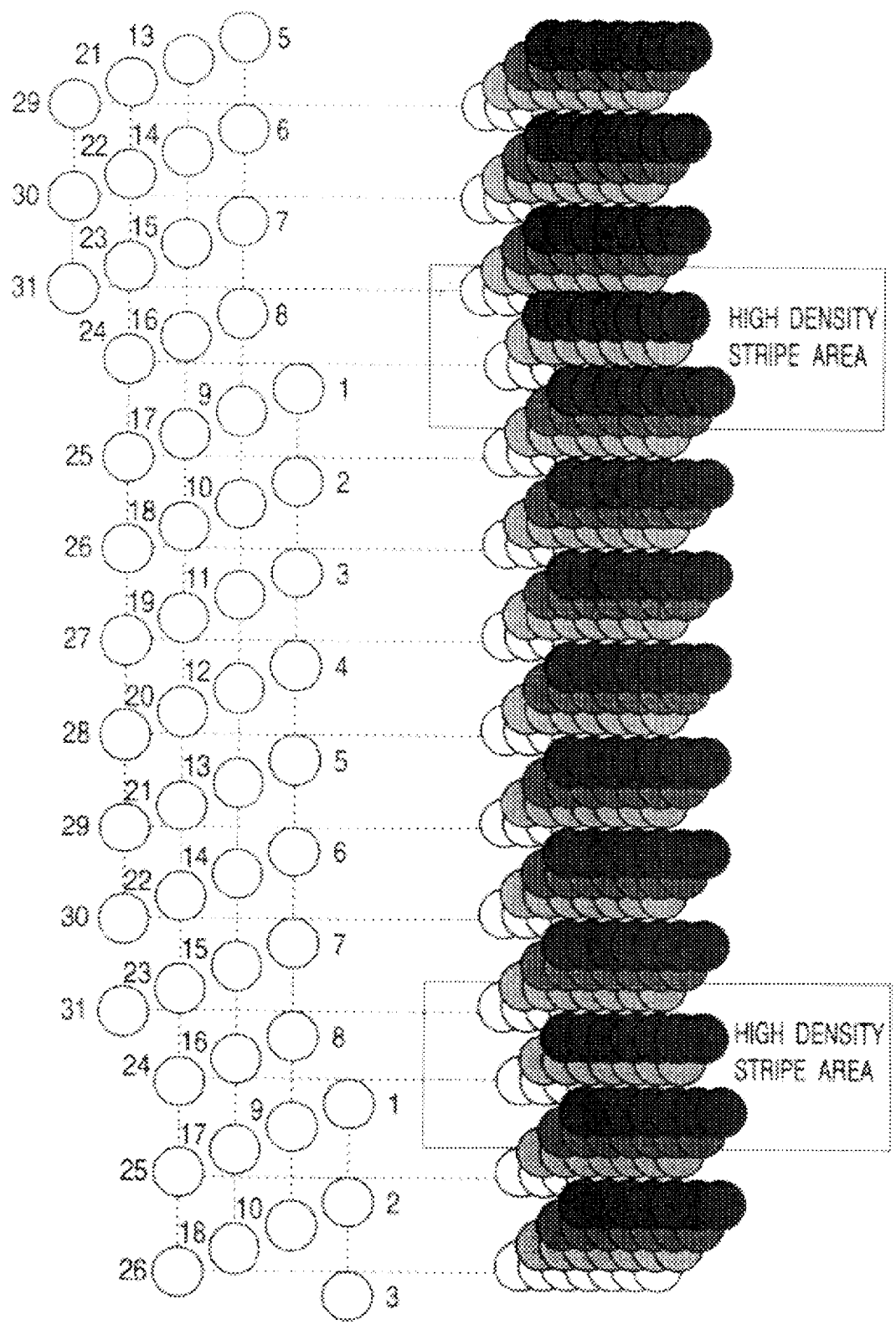
FIG. 12 is a diagram for explaining a print by a conventional "microweave" printing method.

FIG. 2 is a diagram for explaining a print output from the printer of the present invention. In FIG. 2, a print head 2 comprises 31 number of ink jet nozzles arrayed at intervals of $4/720$ inch in the vertical scan direction. The vertical scan distance is set at $29/720$ inch. A interlace basis printing and an intermittent printing are made at the resolution of 720 DPI. The conditions other than the vertical scan distance are the same as for the print by the conventional interlace printing method shown in FIG. 12.

In this embodiment the vertical scan distance is $29/720$ inch while it is $1/720$ inch in the conventional interlace basis printing. Accordingly, the positions of the 30th and 31st nozzles are coincident with those of the 1st and 2nd nozzles after four paths.

The intermittent printing in which the two nozzles, the first and second nozzles counted from the lower end of the nozzle linear array are coincident in position with the two nozzles, the first and second nozzles counted from the upper end of the same, will be referred to as "2-line singling" printing in the specification. A "3-line singling" printing means the intermittent printing in which the three nozzles, the first to third nozzles counted from the lower end of the nozzle linear array are coincident in position with the three nozzles, the first to third nozzles counted from the upper end of the same. A "4-line singling" printing, a "5-line singling" printing, and so on mean the intermittent printing defined in similar ways. A "full singling" printing means the intermittent printing in which the nozzles in the lower half of the nozzle linear array are coincident in position with the nozzles in the upper half of the same, respectively. (Accordingly, the intermittent printing of the present embodiment is the 2-line singling printing.) Thus, a given number of lines counted from the upper and the lower ends of the nozzle linear arrays are coincident with each other, and the "singling" printing method is applied to the printing of those lines. Therefore, the pitches providing the dots of high color density are uniformly distributed over the entire area. The problem of the conventional interlace printing method, viz., the high density stripe areas are distinct when the vertical scan distance exceeds 0.5 mm, is successfully solved.

In this instance, the vertical scan distance is selected such that a plural number of nozzles are positioned at the same places. Therefore, it is inevitable that when all the nozzles are driven, the dots are printed at the same place and hence the printed dot increases its color density. To cope with this, the intermittent printing based on the "singling" printing method is applied to the printing at the places where the dot positions are coincident with each other, whereby those dots are printed at different places arranged in the horizontal scan direction.

Thus, the present invention eases the conditions on the vertical scan distance in the conventional interlace printing method, and makes a given number of lines coincident with each other. By this, the high density stripe areas are prevented from being formed. Further, the invention eliminates the defect resulting from the coincidence of those lines by using the unique intermittent printing.

The condition under which the present invention holds will be described below.

The following definitions are first made. A nozzle interval K is defined by (print resolution)/(nozzle pitch). A microweave pitch M is defined by (vertical scan drive pitch by the vertical scan drive means)/(print resolution). t represents a number of lines to which the intermittent printing is applied. To the t-line singling, the microweave pitch M and the nozzle interval K must be mutually prime. In the singling printing from the first nozzle (#1) to the t-th nozzle (#t), counted from the upper end of the nozzle array 2a, the following conditions must hold to secure the singling position in the K-th path.

[Formula 1]

$$L1(K+1)=M \cdot K +1$$

1u $$L_2(K+1) = M \cdot K + 1 + K = (M+1) \cdot K + 1 \quad 2u$$

$$L_t(K+1) = (M+t-1) \cdot K + 1 \quad 3u$$

Of those equations, the equation 1u) expresses the position of the nozzle #1 in the (K+1)th path, the equation 2u), the position of the nozzle #2 in the (K+1)th path, and the equation 3u), the position of the nozzle #2 in the (K+1)th path.

The nozzles #1 to #t from the upper end of the nozzle array 2a must be coincident in print position with the nozzles #(N−t+1) to #N. To satisfy this, the nozzle positions must be:
[Formula 2]

$$L(N1) = (N-1) \cdot k + 1 \quad 1d$$

$$L(N-1) = (N-1-1) \cdot K + 1 \quad 2d$$

$$L(N-T+1) = (N-T+1) \cdot K + 1 \quad 3d$$

Of those equations, the equation 1d) expresses the position of the nozzle #N in the 1st path, the equation 2d), the position of the nozzle #(N−1) in the 1st path, and the equation 3d), the position of the nozzle #(N−t+1) in the 1st path.

Consequently, the condition under which the present invention holds is to satisfy M+t=N.

In the full singling printing, the microweave pitch M is equal to the singling line t, and then 2M=N must be satisfied.

In case where 32 number of nozzles are used and the printing of the 2-line singling is carried out, M=29, t=2, and N=31. The nozzles to be used for the singling printing are: the nozzles #1 and #2, and the nozzles #30 and #31.

Figure 3:
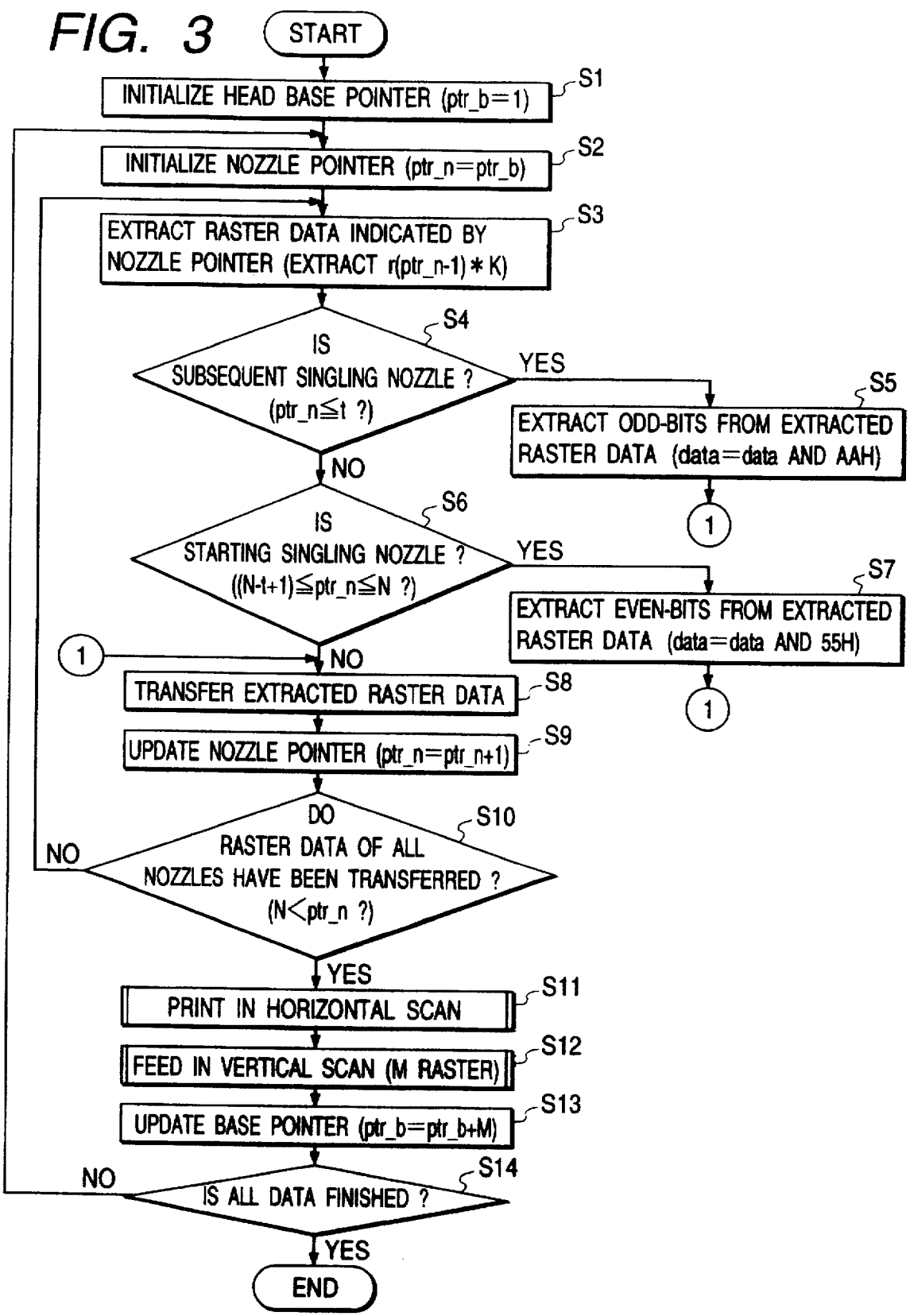
FIG. 3 is a flowchart showing a printing control procedure according to the invention.
Figure 4:
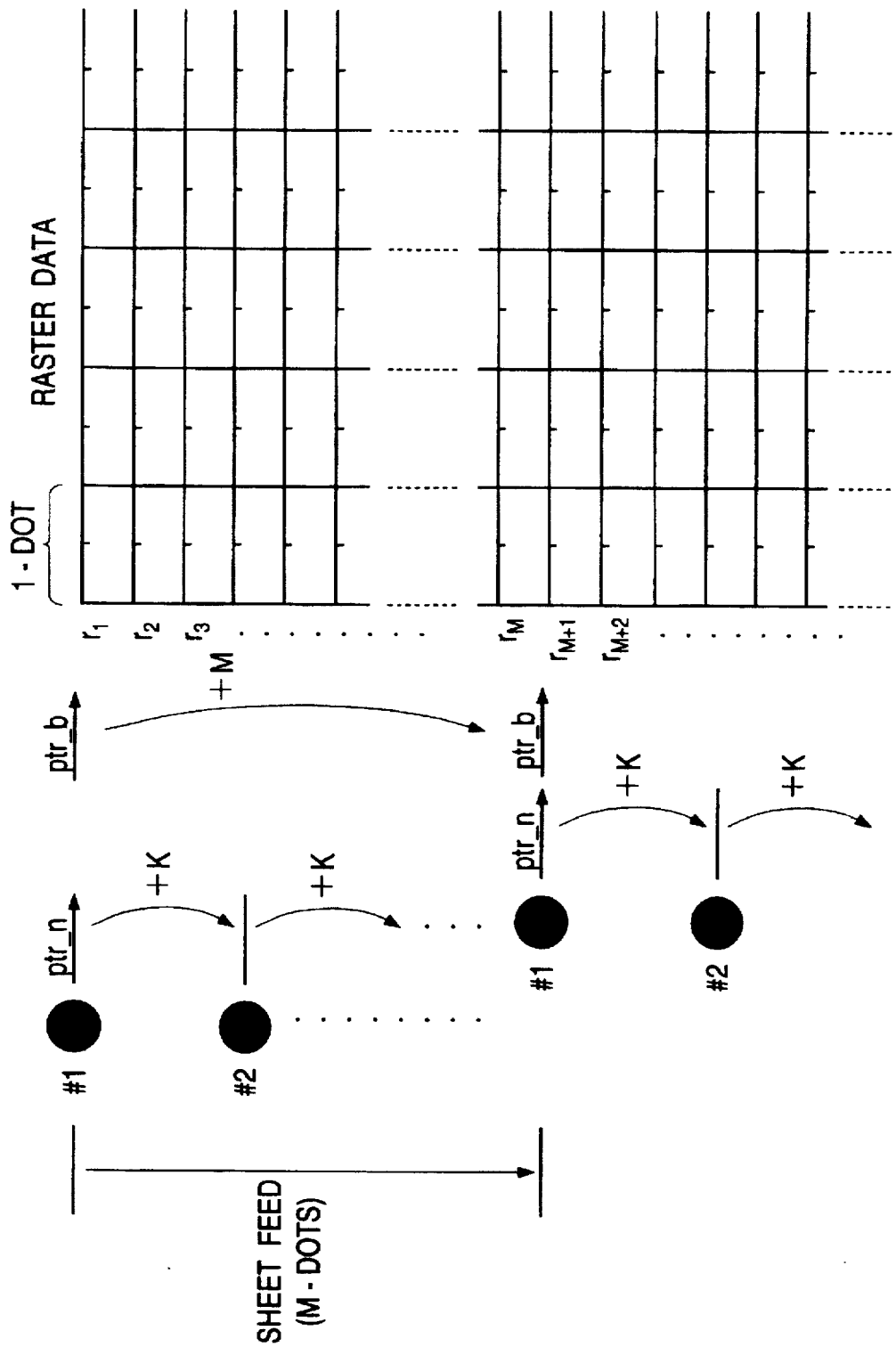
FIG. 4 is a diagram showing a data image to be printed according to the printing control procedure shown in FIG. 3.

FIGS. 3 and 4 are useful in explaining a printing process according to the present invention. Of these figures, FIG. 3 is a flowchart showing a printing control procedure according to the invention. FIG. 4 is a diagram showing a data image to be printed according to the printing control procedure shown in FIG. 3. In FIG. 3, S designates a printing procedural step.

The print head 2 used in the control procedure of FIG. 3 comprises N number of nozzles #1 to #N. Of those nozzles, the nozzles #1 to #t are subsequent singling nozzles; the nozzles #(t+1) to #(N−t), nonsingling nozzles; and nozzles #(N−t+1) to #N start singling nozzles.

The printing apparatus receives print data from a host computer, and temporarily stores it in a buffer memory. The printing apparatus drives the horizontal scan drive means 3, the vertical scan drive means 4, and the head drive means in accordance with the print data, to carry out a desired printing. In the description to follow, print data to be output by the nozzle #1 is expressed by a head base pointer ptr__b and print data (raster data) to be output by the nozzles #1 to #N is expressed by a nozzle pointer ptr__n.

A system control contained in the printing apparatus substitutes 1 for the head base pointer ptr__b for initializing it (S1). Then, the system control substitutes a value of the head base pointer ptr__b for the nozzle pointer ptr__n to initialize the latter (S2). The initialized head base pointer ptr__b points to the start position of the raster data to be printed and the initialized nozzle pointer ptr__n points to the nozzle to next be driven (nozzle #1 in this case).

The system control extracts raster data (r(ptr__n−1)×K) indicated by the nozzle pointer ptr__n from the print data that is stored in the buffer memory (S3). The system control checks whether or not the extracted raster data is the data for the subsequent singling nozzle, viz., prt__n≦t (S4). If the answer in the step S4 is YES, viz., the raster data extracted in the step S3 is for the subsequent singling nozzle, the control extracts the odd-numbered bits from the extracted raster data (S5). Specifically, the odd-numbered bits are extracted by logically multiplying the extracted raster data by "AAH" (="10101010B") every byte (8 bits).

If the answer in the step S4 is NO, viz., the raster data extracted in the step S3 is not for the subsequent singling nozzle, the control further checks whether or not the extracted raster data is the data for the start singling nozzle, viz., (N−t+1)≦prt__n≦N (S6). If the answer is YES, viz., the raster data extracted in the step S3 is for the start singling nozzle, the control extracts the even-numbered bits from the extracted raster data (S7). To extract the even-numbered bits, the control multiplies the extracted raster data by "55H" (="01010101B") every byte (8 bits) as in the case of extracting the odd-numbered bits.

In the steps S4 to S7 of the printing process, if the nozzles to be driven are the subsequent singling nozzles #1 to #t, only the odd-numbered bits are extracted from the data to be printed. If those nozzles are the start singling nozzles #(N−t+1) to #N, only the even-numbered bits are extracted from the printed data. If the nozzles are the non-singling nozzles #(t+1) to #(N−t), all the data to be printed are extracted.

The extracted raster data is transferred to the head drive means (S8), the nozzle pointer ptr__n is updated by incrementing it (ptr__n=ptr__n +1) (S9).

Following the updating of the pointer, the control checks whether or not the raster data of all the nozzles have been transferred (S10), and repeats the sequence of steps S3 to S9.

After the transferring of the raster data ends, the horizontal scan drive means 3 and the head drive means cooperate to drive the print head 2. The printing by the horizontal scan printing is carried out (S11), and a print paper S is fed (by a distance of M rasters) by the vertical scan drive means 4 (S12).

Then, M is added to the head base pointer ptr__b (=ptr__b +M), and the head base pointer ptr__b is updated so as to point to the next position after M lines (S13).

After the end of the pointer updating, the control checks whether or not all the data has been printed (S14), and if the answer is NO, repeats the execution of the sequence of steps S2 to S13 till the printing of all the data ends.

In this way, the printing by the novel and unique interlace printing method of the present invention may be carried out.

Figure 5:
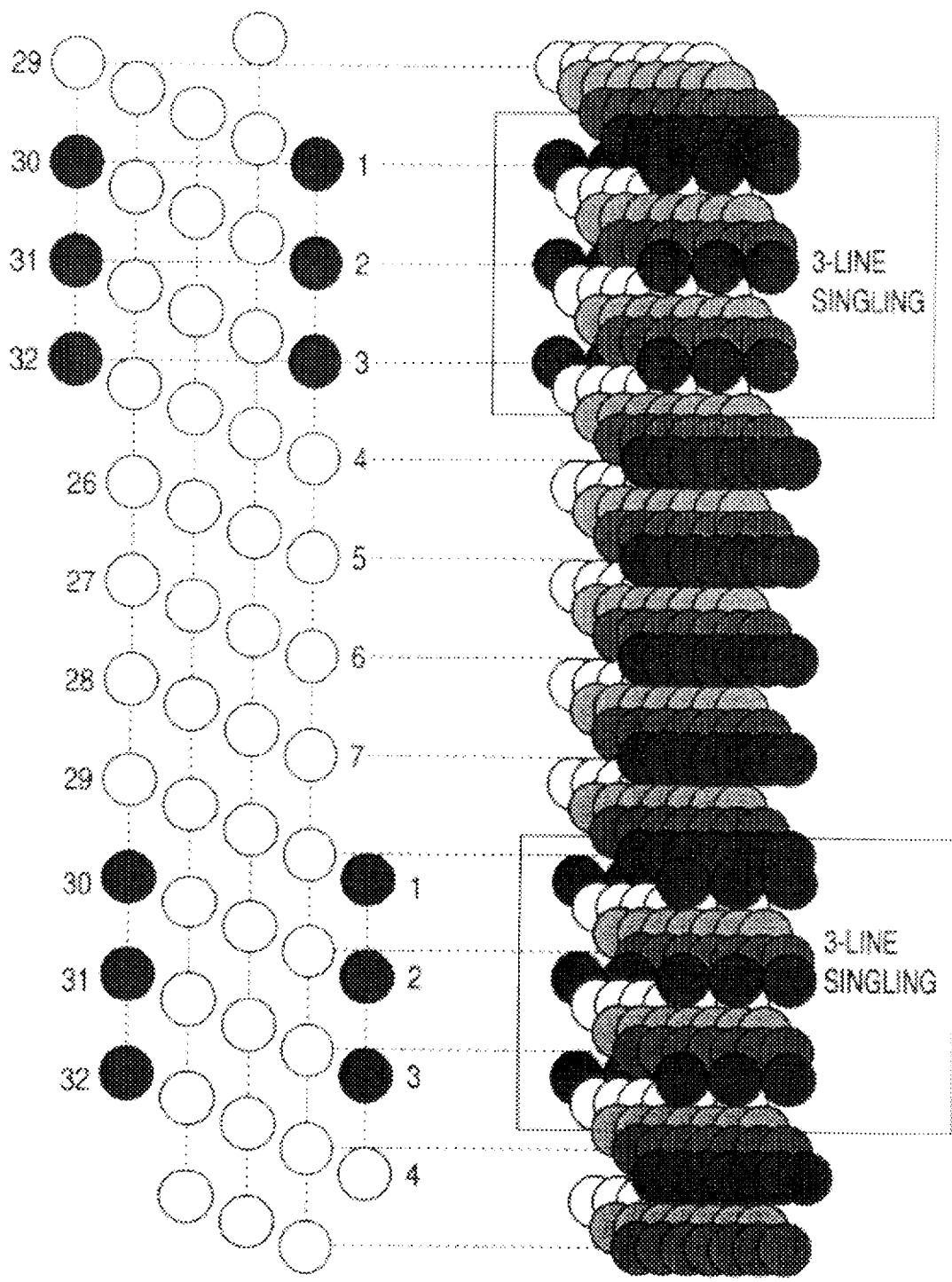
FIG. 5 is a diagram showing a print by the 3-line singling.
Figure 6:
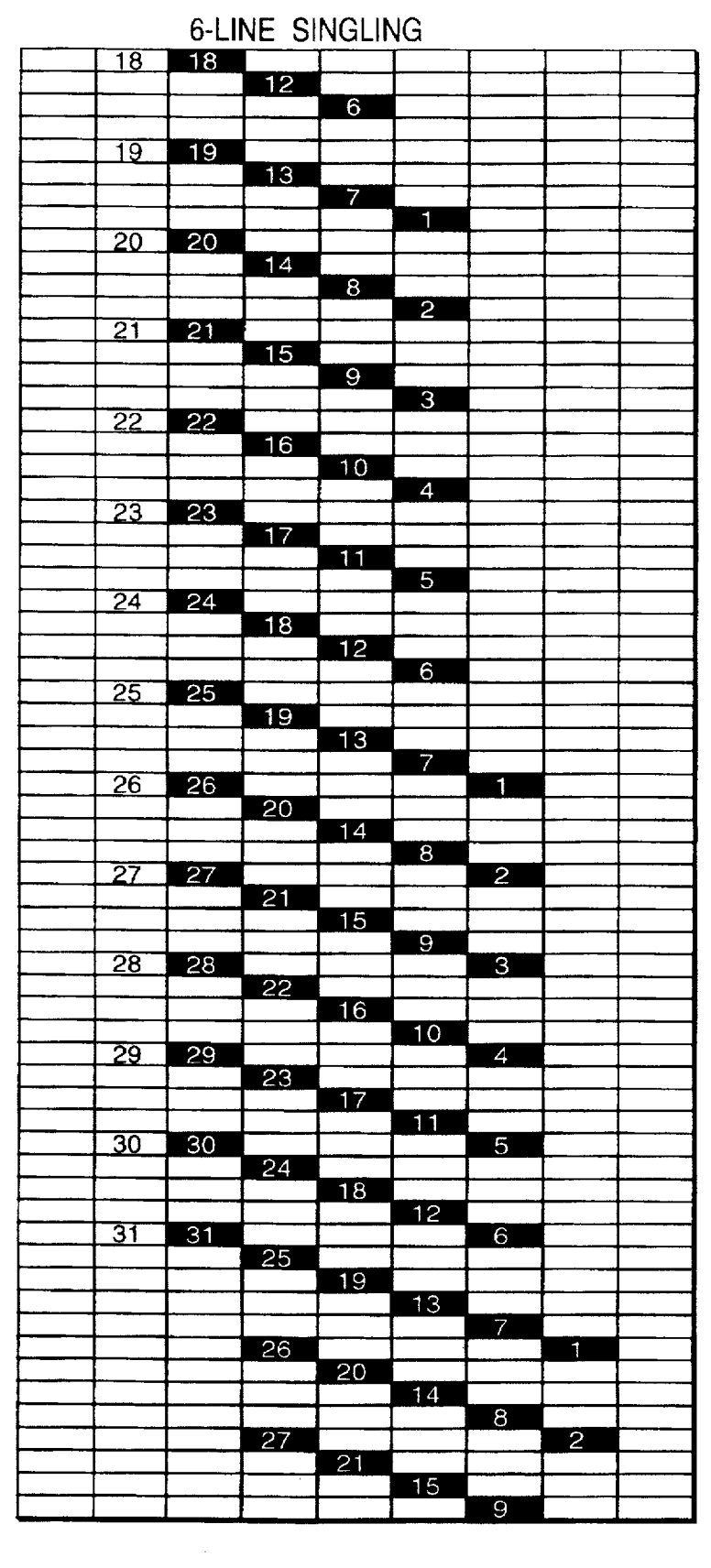
Figure 7:
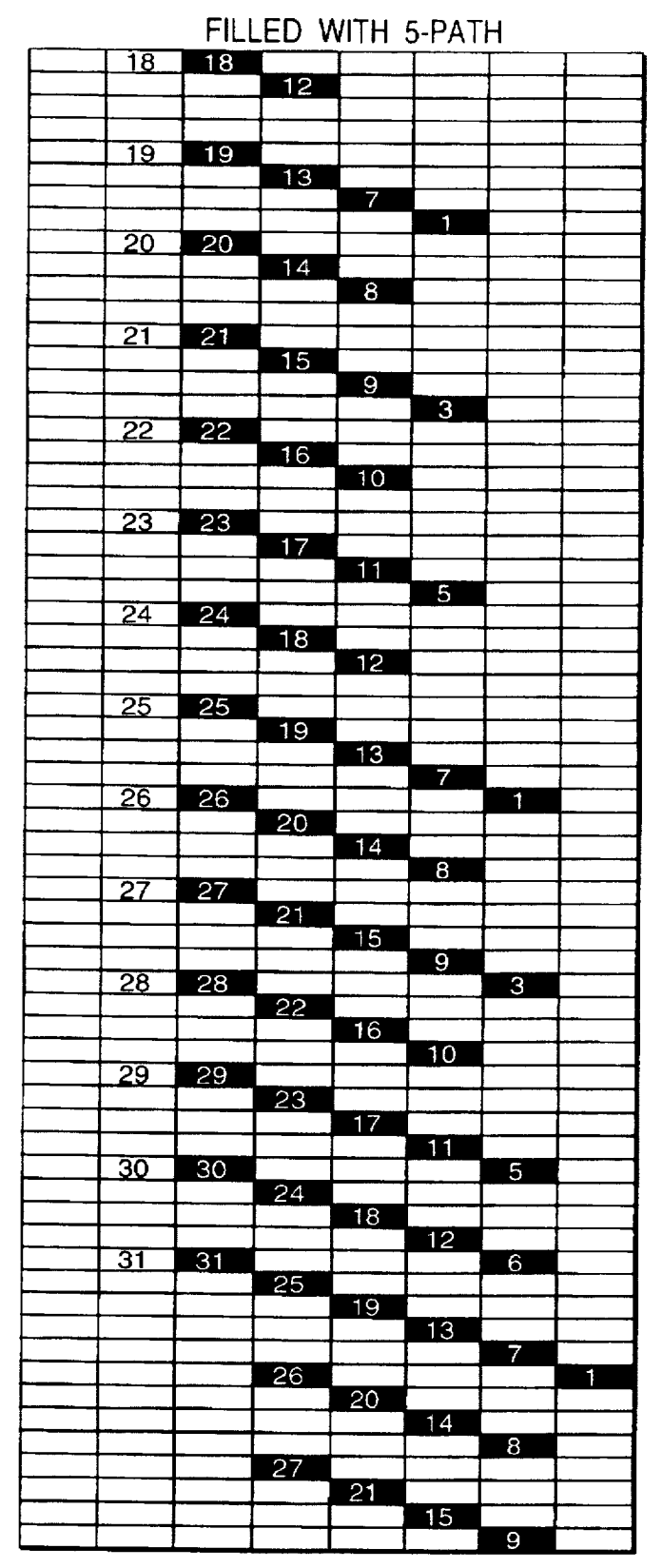
Figure 8:
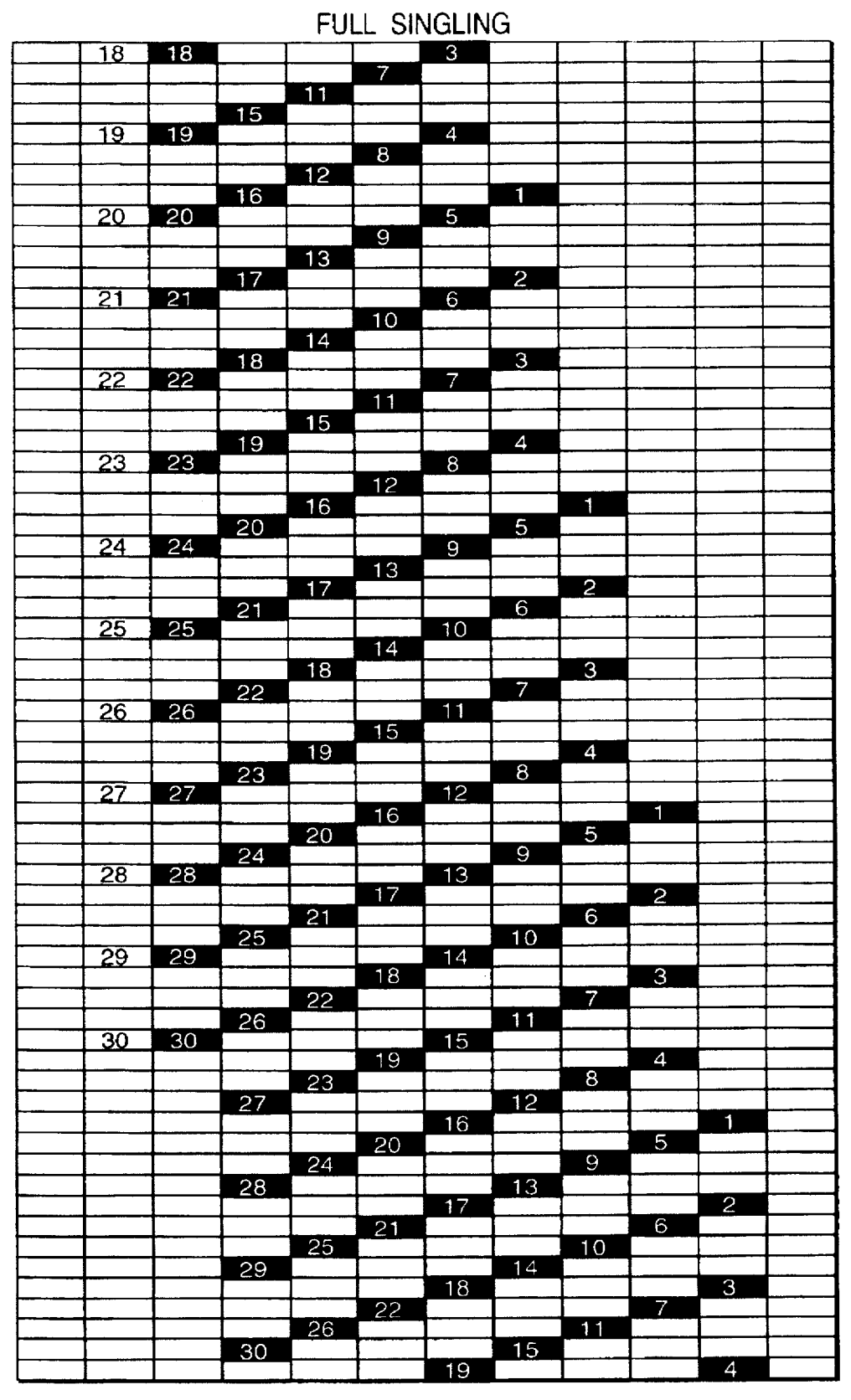
Figure 11:
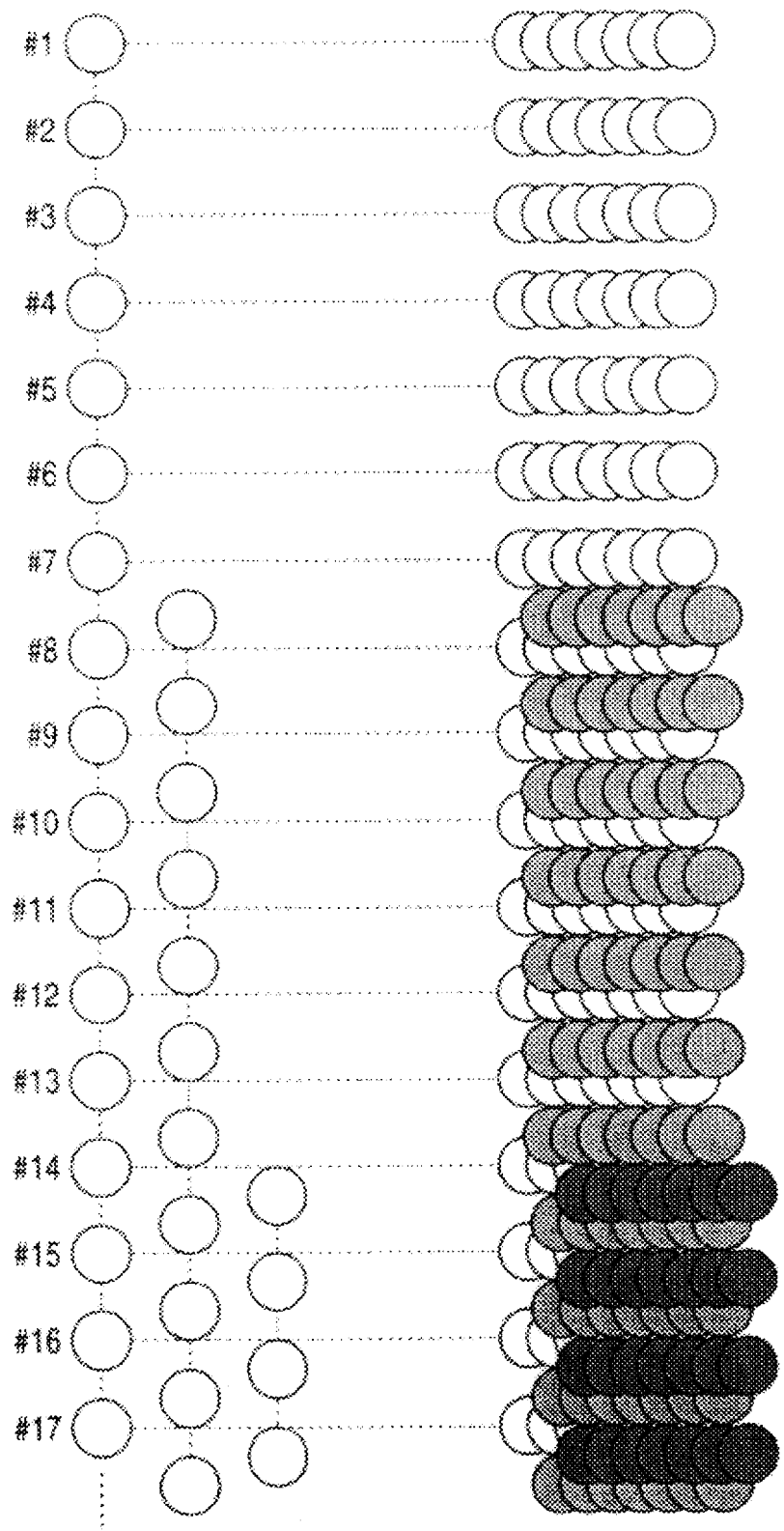
FIG. 11 is a diagram useful in explaining the print by the interlace printing method.

Some prints are presented in FIGS. 5 to 8, which are printed out by the printing apparatus of the invention to confirm the useful effects of the invention. FIG. 5 is a diagram showing a print by the 3-line singling. FIG. 6 is a diagram showing a print by the 6-line singling. FIG. 7 is a diagram showing a print filled with five paths, not using the singling printing method. FIG. 8 is a diagram showing a print by the full singling.

In the print example of FIG. 5, t=3, M=29, and N =32. In the example of FIG. 6, t=6, M=25, and N=31. In the example of FIG. 7, M=25 and N=25. In the example of FIG. 8, t=M=15 and N=30. In printing out those examples, the nozzle interval is K=4 and the resolution is 720 DPI.

FIG. 9 is a table showing the relationships between the variations of the pitch of the vertical scan distance and the image quality in the prints by the conventional interlace printing method, and by the singling printing methods shown in FIGS. 2, and 5 to 8.

As seen from FIG. 9, in the prints by the 2-line singling and 3-line singling, generation of the stripe patters is sufficiently suppressed when comparing with the print by the conventional "singling" printing method. A remarkable improvement of the image quality is confirmed.

In the print by the 6-line singling, stripe patterns appears. The cause of the generation of the stripe patterns is unknown. The print quality is not so improved on the whole. However, the generation of the stripe pattern is suppressed. If the cause to generate additional stripe patterns is removed, the improvement of the print quality will be ensured.

In the print filled with five paths, not using the singling, the stripe pattern distinctly appears. When comparing with this print, it is clearly seen that the present invention succeeds in solving the stripe pattern problem of the conventional art.

In the print by the full singling, stripe patterns appeared at the interval of approximately the paper feed pitch ($15/720$ inch), but the print is beautiful on the whole. Particularly, the print of the solid areas of primary colors, R, G and B is clear and vivid.

The print made by the interlace printing method of the invention into which the "singling" printing method is incorporated showed that the stripe patterns caused by the accumulated variation of the paper feed pitch is effectively suppressed.

Thus, the printing apparatus of the invention can effectively suppress the stripe patterns caused by the increase of the vertical scan distance in the print by the interlace printing method, and provide a quality print.

In the 2- and 3-line singling, the numbers of lines to be printed by the singling are 2 and 3. Accordingly, comparing with the full-line singling, those printing methods can considerably improve the print quality with less deterioration of the throughput.

As seen from the foregoing description, the printing apparatus of the present invention is capable of outputting a quality print even if the vertical scan distance is increased in the printing by the interlace printing method.

What is claimed is:

1. A printing apparatus comprising:
    a print head comprising an array having N dot forming elements arrayed at fixed pitches, said array having a lower end and an upper end;
    horizontal scan drive means for moving the print head above and along a print medium in a horizontal scan direction;
    vertical scan drive means for moving the print medium in a vertical scan direction perpendicular to the horizontal scan direction, wherein a vertical scan distance that the print medium is vertically moved, when the vertical scan drive means is driven one time is selected such that the position of at least one dot forming element from the lower end of the array is coincident with a previous position of at least another dot forming element from the upper end of the array, the coincident position defining a shared horizontal scan line; and
    head drive means for performing a printing operation by intermittently driving said at least one dot forming element and said another dot forming element to print in an intermittent manner with respect to said shared horizontal scan line;
    wherein a microweave pitch M by the vertical scan drive means and an element-to-element interval K are mutually prime, and M+t=N holds, where
    M=(vertical scan drive pitch by the vertical scan drive means)/(print resolution),
    K=(print resolution)/(nozzle pitch), and
    t=number of lines intermittently printed by the head drive means.

2. The printing apparatus according to claim 1, wherein t is 2 or 3.

3. The printing apparatus according to claim 1, wherein t=N/2.

4. A method for printing comprising the steps of;
    moving a print medium in a vertical scan direction so that a position of at least one dot forming element of a array of N dot forming elements of a print head is coincident with a previous position of at least another dot forming element of said array after a given number of horizontal scan drives; and
    performing a printing operation by driving said at least one dot forming element and said at least another dot forming element to print in an intermittent manner with respect to a shared horizontal scan line defined by said coincident position;
    wherein a microweave pitch M and an element-to-element interval K are mutually prime, and M+t=N, where
    M=(vertical scan drive pitch)/(print resolution),
    K=(print resolution)/(nozzle pitch), and
    t=number of lines intermittently printed.

5. The method according to claim 4, wherein t is 2 or 3.

6. The method according to claim 4, wherein t=N/2.

* * * * *

UNITED STATES PATENT AND TRADEMARK OFFICE
CERTIFICATE OF CORRECTION

PATENT NO.    : 5,779,377
DATED         : July 14, 1998
INVENTOR(S)   : Eiji KUMAI et al It is certified that error(s) appears in the above-identified patent and that said Letters Patent is hereby corrected as shown below:

In column 4, line 48, change "microweave" to --interlace--.

In column 5, line 17, change "microweave" to --interlace--.

In column 6, line 57, change "microweave" to --interlace--; and
    line 60, change "microweave" to --interlace--.

In column 7, line 26, change "microweave" to --interlace--.

In column 10, line 13, change "microweave" to --interlace--; and
    line 38, change "microweave" to --interlace--.

Signed and Sealed this

Twenty-sixth Day of January, 1999

Attest:

*Attesting Officer*

*Acting Commissioner of Patents and Trademarks*